March 3, 1964     C. P. BRADLEY     3,122,756

FAUCET HANDLE STOP

Filed Dec. 1, 1961

INVENTOR:
CARL P. BRADLEY
BY
Harrington A. Lackey
ATTORNEY 3,122,756
FAUCET HANDLE STOP
Carl P. Bradley, Blue Ridge, Ga., assignor of fifty percent to Willard R. Palmer, Jr., Smyrna, Tenn.
Filed Dec. 1, 1961, Ser. No. 156,354
3 Claims. (Cl. 4—1)

This invention relates to a stop for a faucet handle, and more particularly to a means for limiting the turning movement of a lever-type faucet handle.

Heretofore, the washers in faucet valves have received extensive wear because the handle has been turned beyond the position necessary to adequately close the valve.

It is therefore an object of this invention to overcome the above disadvantage by providing an adjustable stop to limit the turning of a lever-type faucet handle to a position just adequate to close the faucet valve.

Another object of this invention is to provide an adjustable stop for a lever-type faucet handle which will increase the life of the valve washer from three to ten times, depending upon the degree of mis-use of a faucet handle not incorporating the invention.

Another object of this invention is to provide a stop which may be fitted to different lever-type faucet handles, and which may be adjusted to abut against the wall or the back face of a wash basin at the proper "off" position of the handle.

A further object of this invention is to provide a faucet handle stop which may be permanently or temporarily attached to the handle.

Another object of this invention is to provide a stop for a lever-type faucet handle which comprises a minimum of parts and may be easily and inexpensively manufactured.

Further objects and advantages of the invention will be apparent from the following description taken in conjunction with the drawings, wherein.

Figure 1:
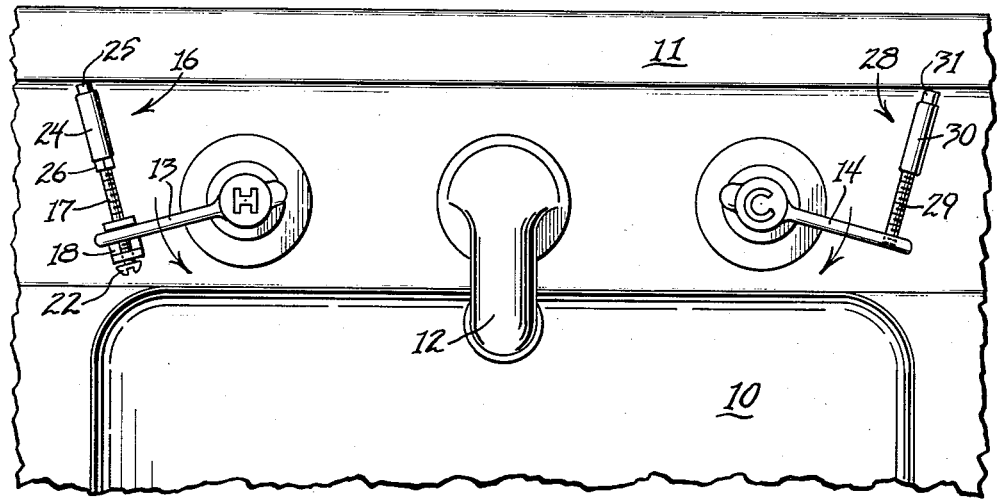
FIG. 1 is a top plan view of two modifications of the invention attached to two different faucet handles mounted on a wash basin, fragmentarily disclosed.
Figure 2:
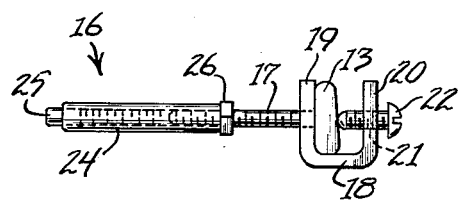
FIG. 2 is a side elevation of the first modification of the invention attached to one of the faucet handles disclosed in FIG. 1.

Referring now more particularly to the drawings, FIG. 1 discloses a wash basin 10 having an upstanding back face or back wall 11, a spigot 12, a lever-type handle 13 for hot water, and a similar type handle 14 for cold water.

Temporarily mounted upon the handle 13 is one modification of a stop 16 comprising an elongated threaded shaft 17. A U-shaped bracket 18 having spaced parallel legs 19 and 20 is fixed to one end of the threaded shaft 17. The end of the shaft 17 may be threaded or permanently attached in any other manner to the outer face of the leg 19, so that the shaft 17 is normal to both legs 19 and 20. An internally threaded aperture 21 is formed in the leg 20 coaxially with the threaded shaft 17. A set screw 22 threadedly engages the aperture 21 and is adapted to be moved into and out of the space between the legs 19 and 20 to bind the handle 13 against the bracket leg 19. In this manner, the stop 16 is firmly secured to the outer end of the handle 13 and adapted to extend substantially normal therefrom in the direction of handle movement for closing the faucet valve, as disclosed in FIG. 1.

An internally threaded tube 24 is adapted to threadedly engage the other end of the shaft 17 so that it may be freely moved longitudinally of the shaft 17 in order to adjust the overall length of the stop 16. The other end of the tube 24 is closed by an abutment member 25, which is preferably made of a resilient material, such as rubber. After the tube 24 has been longitudinally adjusted to its desired position upon the shaft 17, a lock nut 26, which also threadedly engages the shaft 17 is screwed outwardly along the shaft 17 until it abuts flush against the inner surface of the tube 24 to securely lock the tube 24 upon the shaft 17.

Figure 3:
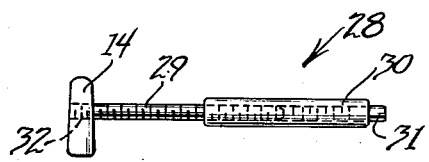
FIG. 3 is a side elevation of the second modification of the invention attached to the other handle of FIG. 1.

Another modification of the invention is disclosed on the cold water handle 14 in FIGS. 1 and 3 in the form of stop 28. This stop 28 also comprises an elongated threaded shaft 29 threadedly engaging an internally threaded tube 30 similar to the tube 24 and having a resilient abutment member 31, similar to the abutment member 25. Although no lock nut, such as 26, is disclosed on the stop 28, it will be understood that such a lock nut may be employed if desired.

The stop 28 differs from the stop 16 primarily in that the inner end of the shaft 29 is permanently attached by insertion into a mating opening 32 in the end of the handle 14. The stop 28 is also adapted to extend substantially normal to the handle 14 in the direction in which the handle 14 is turned to close the faucet valve. The end of the shaft 29 may be fixed in the aperture 32 by soldering or by force-fitting, or by any other type of permanent connection.

The operation of both the stops 16 and 28 are identical, except in the method in which they are attached to their respective handles 13 and 14.

After the stop 16 is attached to its handle 13 by fitting the bracket 18 over or beneath a portion of the handle 13, preferably adjacent its outer end, the set screw 22 is threaded through the aperture 21 until the handle 13 is jammed between the bracket leg 19 and the inner end of the set screw 22. The lock nut 26 is then screwed longitudinally toward the bracket 18 to unlock the tube 24, so that it may be freely adjusted longitudinally of the tube 17 to determine the appropriate position of the stop 16. In order to determine the position of the stop 16, the handle 13 is moved in the direction of the arrow to open the valve, and then slowly reversed until the exact position is located where the faucet valve is barely closed and the dripping of water from the spigot 12 ceases. When this position is determined, the tube 24 is screwed outwardly along the shaft 17 until the abutment member 25 firmly engages the back face 11. In this position, the lock nut 26 is screwed outwardly until it firmly engages the inner face of the tube 24 and thereby locks the tube 24 to the shaft 17. Thus, when hot water is desired, the handle 13 is turned in the direction of the arrow to discharge the desired amount of hot water from the spigot 12. The stop 16 moves as an integral unit with the handle 13. When the desired amount of hot water is obtained, the rotation of the handle 13 is reversed until it is stopped by the engagement of the abutment member 25 with the back face 11.

The operation of the stop 28 is identical to the operation of the stop 16 with respect to the cold water handle 14, except that the shaft 29 is permanently attached in the aperture 32 of the handle 14.

The sizes of the various parts of the stop member 16 and 28 are such that the abutment members 25 and 31 may be adjusted to engage the back face 11, the wall upon which the basin is hung, or any other suitable stationary surface.

In actual experiments, washers in faucets not provided with a stop 16 or 28 were replaced many times more than the washers in faucets whose handles carried the stops 16 or 28.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A faucet handle stop comprising:
 (a) a wash basin having an upstanding back face,
 (b) a faucet mounted on said basin for discharging water into said basin,
 (c) a lever-type handle on said faucet,
 (d) a threaded shaft,
 (e) means for attaching one end of said shaft to extend substantially normal to said handle in the direction in which said handle is turned to close said faucet,
 (f) an internally threaded tube,
 (g) an abutment member mounted to close one end of said tube,
 (h) the other end of said tube being open to threadedly receive the other end of said shaft whereby the combined length of said shaft and said tube may be adjusted,
 (i) said abutment member being adapted to engage said back face to limit the turning movement of said handle after said faucet is closed.
2. The invention, according to claim 1, in which a lock nut is provided to threadly engage said shaft and to abut flush against said other end of said tube.
3. The invention, according to claim 1, in which said handle attaching means comprises a U-shaped bracket, having opposed spaced legs, one leg being fixed to said one end of said shaft, a threaded opening in said other leg coaxial with said shaft, a set screw adapted to threadedly engage said threaded opening, said legs being spaced apart a distance greater than the width of said handle.

References Cited in the file of this patent

UNITED STATES PATENTS

| | | |
|---|---|---|
| 564,500 | Benedict | July 21, 1896 |
| 1,876,556 | Boden | Sept. 13, 1932 |
| 2,322,123 | Garratt | June 15, 1943 |
| 2,349,742 | Macavoy | May 23, 1944 |
| 2,774,622 | Priebe | Dec. 18, 1956 |
| 2,824,465 | Riley | Feb. 25, 1958 |

FOREIGN PATENTS

| | | |
|---|---|---|
| 53 | Great Britain | of 1909 |